United States Patent

Heen

(10) Patent No.: US 8,744,402 B2
(45) Date of Patent: Jun. 3, 2014

(54) ALERT SYSTEM WITH CONTROLLED LOAD OF NETWORK

(75) Inventor: Kjell-Harald Heen, Oslo (NO)

(73) Assignee: Unified Messaging Systems AS, Oslo (NO)

( * ) Notice: Subject to any disclaimer, the term of this patent is extended or adjusted under 35 U.S.C. 154(b) by 254 days.

(21) Appl. No.: 13/322,068

(22) PCT Filed: May 27, 2010

(86) PCT No.: PCT/NO2010/000193
§ 371 (c)(1),
(2), (4) Date: Nov. 22, 2011

(87) PCT Pub. No.: WO2010/137993
PCT Pub. Date: Dec. 2, 2010

(65) Prior Publication Data
US 2012/0064819 A1 Mar. 15, 2012

(30) Foreign Application Priority Data

May 27, 2009 (NO) .................................. 20092069

(51) Int. Cl.
*H04W 4/22* (2009.01)
(52) U.S. Cl.
USPC ..................... 455/404.2; 455/456.3; 455/567; 455/404.1
(58) Field of Classification Search
USPC ............... 455/3.01, 404.1, 404.2, 456.1, 453, 455/456.3, 457, 557, 414.3, 413, 466, 521, 455/567; 370/312
See application file for complete search history.

(56) References Cited

U.S. PATENT DOCUMENTS

| 7,617,287 | B2 * | 11/2009 | Vella et al. ..................... 709/207 |
| 2004/0103158 | A1 | 5/2004 | Vella et al. |
| 2006/0178128 | A1 * | 8/2006 | Eaton et al. ................. 455/404.1 |
| 2013/0195000 | A1 * | 8/2013 | Shen et al. ..................... 370/312 |

FOREIGN PATENT DOCUMENTS

| EP | 1 045 604 A2 | 10/2000 |
| WO | 2005/062582 A1 | 7/2005 |

OTHER PUBLICATIONS

International Search Report from PCT/NO2010/000193 dated Oct. 4, 2010 (3 pages).
Written Opinion from PCT/NO2010/000193 dated Oct. 4, 2010 (6 pages).
International Preliminary Report on Patentability from PCT/NO2010/000193 dated May 6, 2011 (10 pages).
Norweigian Search Report from Patent 20092069 dated Dec. 21, 2009 (2 pages).

(Continued)

*Primary Examiner* — John J Lee
(74) *Attorney, Agent, or Firm* — Osha Liang LLP

(57) ABSTRACT

A method for preventing overload and blocking of a mobile network when sending of alert messages to a plurality of mobile phone users located in a specific geographical area, independently of any user preferences on mobile phones, wherein the method is performed in an optimizing message distribution component (A-SMSC) connected to the mobile network, has an alert initiating message receiving step of receiving an alert initiation message having information about content of the message and where the message is to be sent, represented as relevant cells, performed as a request from an LBAS Server to A-SMSC, and information about the relevant cells is determined by a LBAS GT by converting information of a specific geographical area to corresponding cell ids.

15 Claims, 4 Drawing Sheets

(56) References Cited

OTHER PUBLICATIONS

Murase, Ichiro et al.; "Standardization Activity on Emergency Telecommunication System in ITU-T"; Proceedings of the 2004 International Symposium on Applications and the Internet Workshops; Piscataway, NJ, USA; IEEE, pp. 198-203; Jan. 26-30, 2004 (6 pages). Espacenet Abstract EP1045604A2; Publication Date Oct. 18, 2000 (1 page).

* cited by examiner

ALERT SYSTEM WITH CONTROLLED LOAD OF NETWORK

BACKGROUND

1. Technical Field

The present invention relates to a population alert system for sending alert messages to users staying at a specific geographical location. More specifically, the invention describes a method and a system for efficiently locating and sending messages to mobile phones located within a specific area, without overloading the network, and independent of any user preferences.

2. Related Art

Today people are exposed to more threats than for just a few decades ago, and at the same time efficient existing methods for alerting people are based on old technology used for alerting of war related scenarios like bomb and missile attack. This is not considered to be usable for methodical alert for emergency situations related to unpredictable weather conditions due to climatic changes, increased transportation through dense populated areas, industry located close to populated areas, infrastructure breakdown, and increased risk for terrorism.

New and efficient methods for alerting and protecting people is therefore a highly focused area within the EU and US, but also in Asian countries which are often exposed to natural disasters like tsunamis and earthquakes. Billions of Euros have been spent in developing systems and methods to detect and predict in advance different kinds of natural and man made hazards (e.g. Global Monitoring Environmental Security (GMES) program). A predictive monitoring system has less or no value if it is not capable of alerting people exposed to the danger. Finding new and more efficient methods for alerting people is therefore a highly focused topic.

A complete population alert system must make use of multiple channels for distribution of alert messages, but the capability to alert mobile users is regarded to be the most important and critical feature.

SUMMARY

Secure and efficient alert of mobile users has up to date has not been sufficiently achieved with regard to overload and efficiency aspects. Some conventional systems suffer from being ineffective and vulnerable due to the fact that alert messages have to go through the existing structure and devices in the mobile network in the same way as other calls, thereby exposing the system for overload when sending a lot of alert messages at the same time.

The applicant has developed a method and a system described in the prior filed patent application NO-20076122, also named LBAS (Location Based Alert Services) addressing some weaknesses in corresponding known systems.

Experience shows that a mobile network experience heavy load in areas where an emergency situation occur. When sending large amounts of alert messages at the same time, the network will become unstable, and the probability for slowing down the network increases. A total breakdown of the network may further occur.

This is very disadvantageous since the purpose of efficient alerting is to send as many alert messages as fast and efficient as possible to mobile phone users staying at a specific geographic area.

One or more embodiments of the present invention is a further advancement of the said LBAS system, and contributes to a fast and efficient alerting without letting the network break down due to overload.

One or more embodiments of the present invention is described by a method for preventing overload and blocking of a mobile network when localizing and sending of alert messages to a plurality of mobile phone users located in a specific geographical area, and doing so independently of any user preferences on the mobile phones, where the method is performed in an optimizing message distribution component (A-SMSC) connected to the mobile network, and where the method comprises the following steps:

a) receiving an alert initiation message comprising information about the content of the message and where it is to be sent, represented as relevant cells, and where this is performed as a request from an LBAS Server to A-SMSC, and information about the relevant cells is determined by the LBAS GT by converting information of a specific geographical area to corresponding cell ids;

b) receiving updated information of mobile station ISDNs (MSISDN) number with current serving cells on base station system (BSS) level, and where information is acquired by looking up entries in the LBAS Db with updated information of MSISDN numbers of the mobile phones connected to the relevant cells, represented by cell ids within the specific requested geographical area;

c) assessing received information and determine the relevant mobile phones with corresponding MSISDN numbers to send alert messages to;

d) placing a prevention tag for the determined relevant mobile phones on MSC/VLR level, where the tag indicates that the mobile phones with corresponding MSISDN numbers that alert messages are going to be sent to are not authenticated when these are trying to initiate a call from the specific geographical area to MSC, and further that external calls to the determined relevant mobile phones are not to be connected;

e) sending alert messages from the A-SMSC through a serving MSC to relevant mobile phones with corresponding MSISDN numbers located in the specific geographical area, and f) removing placed tags for said relevant mobile phones after finishing the alerting.

One or more embodiments of the present invention is also characterized by a system for performing the method described above.

One or more embodiments of the present invention provides a location based alert service (LBAS) to enable a secure and efficient way of alerting mobile users within a geographical area, and where this is done without overloading or blocking the mobile network that is used for the alerting.

One or more embodiments of the invention ensures that emergency personnel and other important resources connected to the network via specific MSISDN numbers get access to the mobile network while alerting is in progress.

BRIEF DESCRIPTION OF THE DRAWINGS

The present invention will now be described in more detail with reference to the figures wherein.

DETAILED DESCRIPTION

Hereafter, embodiments of the invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
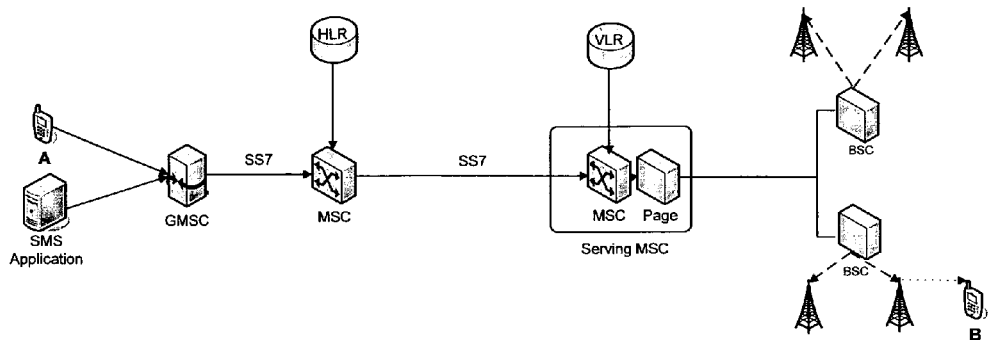
FIG. 1 shows a general architecture of the system when a mobile phone "A" is making a call to a mobile phone "B"

FIG. 1 shows a general architecture of the system involved when a mobile phone marked as "A" is making a call to another mobile phone marked as "B". This figure visualizes the complexity of the network, and why special considerations are needed when using the mobile infrastructure as the channel for distribution of alert messages.

Before a phone connection or a distribution of a message between two mobile phones can take place, a rather complex and resource consuming process is performed in order to be able to identify the location of the mobile phone to receive the call.

The following steps will be performed when "A" is making a call to "B":

1. "A" is connected to the closest Gateway Mobile Switching Center (GMSC) which identifies the "Switch and Home Location Register" (HLR) which "B" belongs to;
2. A connection to the HLR is performed to find fundamental information of "B", in particular to identify the switch that "B" was last reporting to;
3. A connection to the identified switch is performed;
4. A look up in the Visitor Location Register (VLR) is performed to verify if "B" is still connected to the identified switch, and if so a more exact position of "B" is identified through the Local Area Code (LAC);
5. A paging process (explained below) is initiated. All the Base Station Controllers (BSC) within the local area of "B" is asked to page the mobile of "B" over all the cells in the local area.
6. If "B" responds (i.e. is detected within a cell), and if there is a free channel, a channel allocation is taking place and "B" is ready to receive the message.

GMSC is the switching centre that all mobile to mobile calls are routed through.

HLR is a global database that resides within a cellular network to hold current details about a subscriber, the equipment in use, the service(s) required, the user's identification encryption code, and the users "Home" cell, and what network the subscriber was last known to be using.

VLR is a database similar to HLR, but with storing of national location data.

LAC is the local area code indicating a current geographical area.

BTS—Base Transceiver Stations is the heart of a cellular mobile phone system, and is a network of distributed transmitting/receiving radios in fixed locations.

BSC is used to control groups of BTSs, provide mobility management for mobile stations, anchor air-link protocols and provide connection to a mobile switching centre (MSC). The composite collection of one or more BTS and the associated BSC will form a base station system (BSS).

Paging is one of the key elements which make mobile telephony possible. It is a critical process, both with regard to correct localization and optimizing of radio network traffic, i.e. what is actually paging and how it is working.

In order to be able to establish a voice call or sending a SMS, it is necessary to know to which radio cell the mobile device is connected to. The VLR has an approximate knowledge of where the mobile device is located. In the VLR, the mobile device is located on the local area level (LAC). A local area will vary from place to place and operator to operator, but it is common that a LAC may contain hundreds of cells. Since the VLR knows which LAC the receiving mobile device is located within it will need to search for the mobile device within the LAC to get the exact cell. This is where the paging process is starting. Briefly explained it works as follows:

Paging is performed by the serving MSC which is responsible to deliver the message;

The MSC is ordering all the BTSs within the LAC to perform a page. A mobile id (IMSI—International mobile subscriber identifier is a GSM term used to uniquely identify a subscriber to a specific carrier and country) is sent over the air via a particular paging channel;

The mobile device recognizing the id will respond to the page with a cell id;

The cell id is received at the MSC and the location of the mobile device is identified;

The MSC is now ready to transmit the message.

As seen from FIG. 1, call or message routing is a complex process designed for communication between two mobile devices. With huge load, like automated mass broadcast of messages and careless use of the network, there are several places within the message routing process that can be overloaded and congested. Heavy load on both the HLR and VLR can cause serious problems breaking down the mobile "network subsystem". Large paging activities are also a vulnerable signalling activity which can cause congestion and overload of the "Base station subsystem". These aspects have motivated the creation of LBAS.

Figure 2:
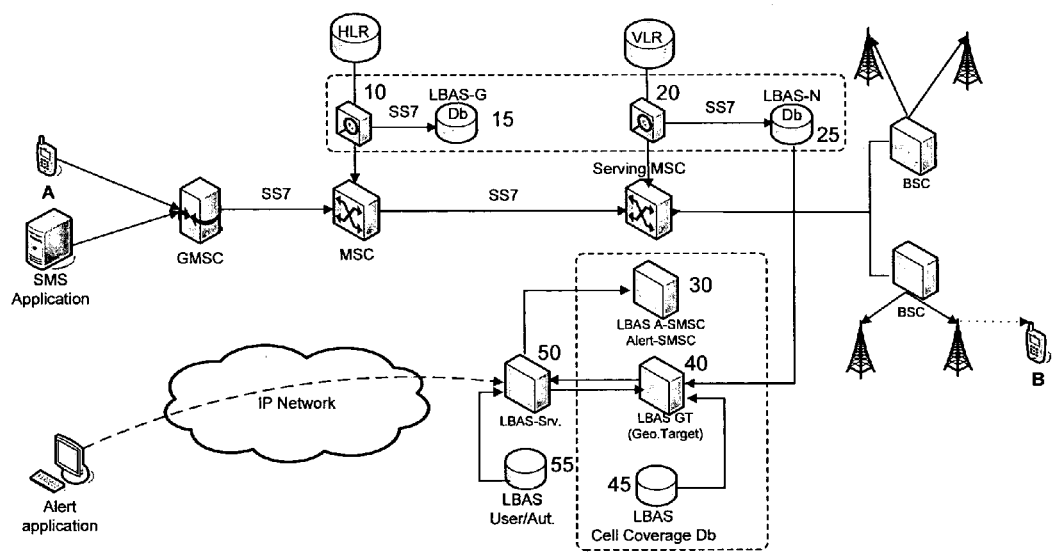
FIG. 2 shows the architecture of LBAS compared to the architecture of traditional distribution of SMS.

FIG. 2 shows the architecture of LBAS compared to the architecture of traditional distribution of SMS. This figure illustrates how the LBAS system can optimize and reduce the routing process, and thereby avoiding overload of the network when sending a large amount of messages simultaneously. The LBAS specific environment is shown within frames with broken lines.

The difference from ordinary call/message routing is the extended information LBAS has about the recipients of the message. Having in mind that the LBAS database, which is described below, is containing the current coverage cell, i.e. the geographical location of each mobile handset belonging or roaming to the mobile operator there is no need to connect to the HLR to find the last reported switch of the called party, or to connect to the VLR to find the location area of the called party. Further there is no need to page all cells within a local area which may be hundreds. It is only necessary to page the cells covering the actual area to alert.

Since the above mentioned procedure for sending a message from one mobile phone "A" to another "B" is technically resource consuming, and in this case unnecessary, the LBAS will address the distribution of alert messages in a more direct and efficient way over the SS7 mobile phone network (SS7 is the set of telephony signalling protocols used for setting up public switched telephone network calls) thus avoiding the above mentioned vulnerable operations.

LBAS is divided into the following major components as shown in FIG. 2:

1. Storing of real time national user/location data into LBAS National database 25, containing local area and cell coverage for each national mobile user and visitor (foreign tourists) to the network. This database is the source for the optimizing message routing component (A-SMSC);
2. Storing of real time global user/location data into the LBAS Global database 15, containing country and part of country (thus the MSC) that the national mobile users are roaming to abroad. This function has global coverage, and
3. Optimized message routing (by means of A-SMSC 30), enabling a more efficient and network friendly way of routing alert text messages in the mobile network.

Probes 10, 20 are located between HLR and VLR and corresponding MSCs for monitoring traffic and updating the LBAS Databases 15, 25. Said A-SMSC 30 will only read and process data from the VLR providing information concerning national location data, since in the case of global alerting, an alert message may be terminated with an unknown operator.

The probe is a component designed to monitor the traffic between two components within a network without interfering the traffic. In this case the traffic between the MSC and said HLR and VLR databases. A probe comprises a computer with signalling means connecting to the network for monitoring traffic. LBAS software for storing location traffic in a relation database (LBAS Db) is a part of the probe software.

An LBAS Web service 50, 55 will work as an interface between the alert application/protocol and LBAS core environment. It further performs the following optimization tasks after the localization process has been finished by LBAS GT, but previous to the sending process the following is executed by LBAS A-SMSC:

Quality assuring the location, e.g. checking whether an incidence is still of current interest or if location update date is too old;

Reorganizing the table over identified MSISDN (returned from LBAS-GT) according to cells and cell capacity for achieving as optimal input to A-SMSC as possible for attaining the most constant load of the radio interface/cells;

Possible washing of data in the cases where there is a registration/priority service where the number must be verified before sending.

After the alert is authorized by the LBAS Service, the first operation taking place is the localization of the cells covering the relevant area. This is performed by the LBAS GT (Geo-Targeting module) 40. Inquiries to the LBAS Db is performed for finding incidents that match with the cells covering the current area. The result, which in practice is a list over all MSISDNs with the latest location update from one of the cells covering the area is further returned to LBAS server that is executing the tasks described for LBAS Server (web service).

The A-SMSC 30 is a key component of LBAS, performing optimized transmission of the short messages.

Figure 3:
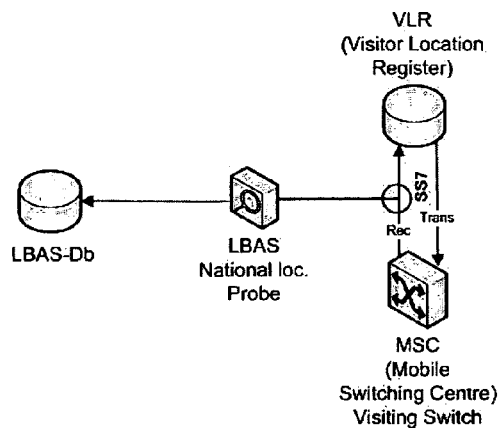
FIG. 3 shows a probe monitoring the traffic from the MSC to the VLR.

FIG. 3 shows a probe monitoring the traffic from the MSC to the VLR thereby enabling storing of national location data. The probe which is an ss7 component is installed in the operator's network subsystem. Traffic identified as location information is absorbed and updated in the LBAS National Database containing real time location data of all subscribers and roaming visitors within the network. The method for storing national location data is as follows:

The probe is monitoring traffic received by the VLR. Traffic related to location updates delivered to the VLR is identified and stored in the LBAS national Db. Amongst the MAP (Mobile Application Part) messages identified and containing location data are e.g. MAP_UPDATE_LOCATION AREA (reporting entrance of a new LAC) and MAP_PROCESS_ACCESS_REQUEST_ACK (response of page of mobile devices which occurs when sending and receiving messages and phone calls). These messages are containing both LAC and Cell Id.

The record inserted or updated in LBAS Db is containing: IMSI (International Mobile Subscriber Identity) or MSISDN, Cell Id, Lac Id, date and time.

Figure 4:
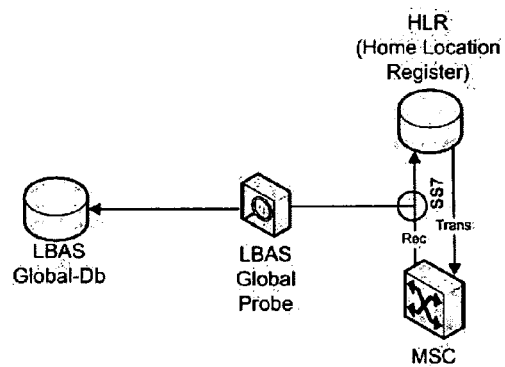
FIG. 4 shows a probe monitoring the traffic from the MSC to the HLR.

FIG. 4 shows a probe monitoring the traffic from the MSC to the HLR enabling storing of global location data. The probe is installed in the operator's network subsystem enabling storing of real time location data of all national mobile users abroad.

The method for storing of global location data is as follows:

The probe is only monitoring traffic received by the HLR. When a mobile device arrives at a new country or is travelling over some distance within the country, it will enter the coverage of a new MSC. The VLR of the serving MSC abroad will ask the subscribers HLR for some vital customer information. At the same time it will send location information regarding which MSC the mobile device currently is served by (MAP_UPDATE_LOCATION) to the HLR at home, this message is then identified and an update of the LBAS Global Db is performed.

The monitored data comprise: IMSI (International Mobile Subscriber Identity), MSC, Country/part of country, date and time.

Global location data is not as exact as national location data since the accuracy is limited to MSC level.

Figure 5:
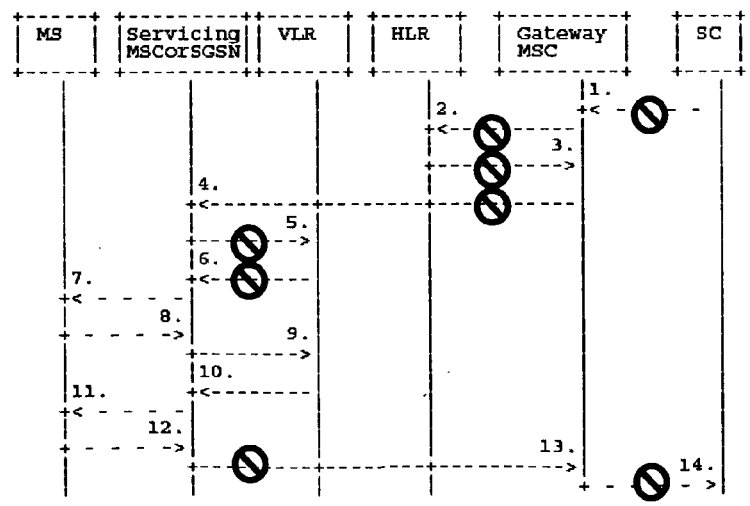
FIG. 5 shows the standard SMS send procedure in detail.

FIG. 5 shows the standard SMS send procedure together with the steps that are skipped by using LBAS according to one or more embodiments of the present invention for optimizing the message distribution.

As is apparent from this figure, routing of a message or call is a complex procedure with several vulnerable components. Due to the fact that LBAS both know which cells that are going to be alerted and which phones that are connected to the different cells, all necessary parameters is in place to avoid the resource consuming routing and localization process, thus reducing the load of the operator's "Network Subsystem". Another aspect is the load on the "Base Station Subsystem". Since we know which cells that are covering the area, we only want to perform a paging procedure for mobile devices that are still connected to these cells, thus reducing the load on the "Base Station Subsystem".

Steps 1-3 are the routing phase which is described above with reference to FIG. 1. These steps are not performed in LBAS;

Step 4 is the forwarding of the SMS from the gateway MSC to the servicing MSC. This step is not performed in LBAS because the message is sent from A-SMSC which is directly connected to the serving MSC;

Step 5 is performed for retrieving subscriber related data. This step may or may not be performed;

Steps 6-10 are the paging process. This process is performed but is proposed optimized by only paging relevant cells within the alert area, instead of all the cells within the LAC;

Steps 11-12 are sending of the SMS and confirmation to the servicing MSC, and

Steps 13-14 are acknowledgement of the message sent and forwarded to the gateway MSC. This step is not performed in LBAS.

Figure 6:
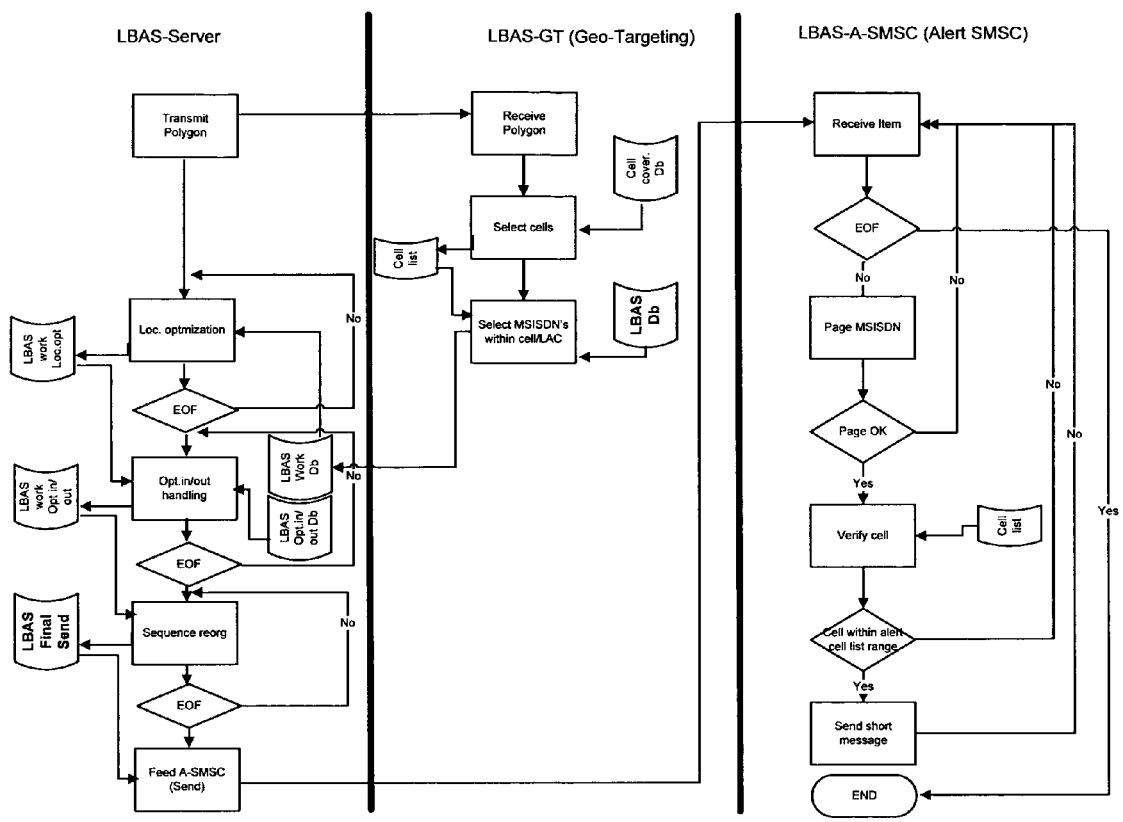
FIG. 6 shows the optimized work flow of message distribution performed by a message distribution component.

FIG. 6 shows the modified and optimized work flow of message distribution for locating and alerting a plurality of mobile phone users located in a specific geographical area, and doing so independently of any user preferences, by sending alert messages to relevant mobile phones, and where the method is optimized for avoiding overload and congestion of the network. The method is performed in LBAS Server, LBAS GT and LNAS A-SMSC. The method comprises the following steps:

a) receiving an alert initiation message comprising information about the content of the message and where it is to be sent, represented as relevant cells, b) receiving updated information of mobile station ISDN (MSISDN) numbers with current serving cells on base station system (BSS) level, c) assessing received information and determine the relevant mobile phones with corresponding MSISDN number to send alert messages to, d) optimizing location data prior to sending (explained further below), and e) sending the alert messages from A-SMSC through a serving MSC to relevant mobile phones located in the specific geographical area.

In one embodiment, the A-SMSC is further connected to LBAS GT with information about the geographical area where the alert messages are to be sent. LBAS GT receives this information as a request from a LBAS Service requesting initiation of alerting of mobile phones in a specific geographical area represented by different cells. The request may comprise a polygon containing the coordinates of the area to alert.

The LBAS Service is connected to an interface for managing and controlling the method, and the interface is used for selecting type of alert message and the geographical area to where the messages are to be sent.

LBAS GT will convert the specific geographical area to corresponding cell ids that are located inside the specific area. This is performed by looking up entries in a database cell list, and cell coverage Db, thus acquiring information on which geographical area each cell is covering, and screening only cells that are located in the relevant geographical area.

The LBAS GT is further connected to a location based alert system database (LBAS Db) with updated information of MSISDN numbers, thus the mobile phones, together with the ids of the serving cells that they are connected to. The LBAS Db is kept updated by using a probe explained above (ref. FIG. 3).

The information from the LBAS Db is acquired by LBAS GT and is the input data in step b) above.

After the steps described above, the LBAS GT has received cell ids defining the geographical destination area of the alert message, and the relevant MSISDN numbers with connected cell ids in the geographical destination area.

After this LBAS GT returns the generated lists to LBAS Server which performs the following necessary optimizations mentioned in step d) above:

Quality assuring the location, e.g. checking whether an incidence is still of current interest or if location update date is too old;

Reorganizing the table over identified MSISDN (returned from LBAS-GT) according to cells and cell capacity for achieving as optimal input to A-SMSC as possible for attaining the most constant load of the radio interface/cells, and Possible washing of data in the cases where there is a registration/priority service where the number must be verified before sending.

A-SMSC continuously receives data from LBAS and performs a paging procedure on each MSISDN number for checking whether the returned ids still are within the range of the cells covering the relevant geographical area. The paging procedure itself is performed in a module comprised in the serving MSC, but it is initiated by A-SMSC.

This corresponds to assessing step c) above.

A-SMSC is further connected to a base station controller (BSC) for controlling cells represented by groups of base transceiver stations (BTS) located at fixed geographical locations ensuring mobility management for mobile stations.

If the paging procedure described above is affirmed, the alert message is sent from the A-SMSC through said serving MSC to all the relevant mobile phones located in the specific geographical area.

In this process, A-SMSC measures the time elapsed from sending an alert message to an MSISDN number through its connected cell to receiving a confirmation from that cell, and if the time elapsed is above a certain limit, the A-SMSC will reduce the load of the current cell by sending the next alert message through another cell.

The paging procedure described above is performed on all entries in the LBAS working database until the end of the file in the randomized working LBAS database has been reached.

One or more embodiments of the present invention also comprises a method and system for more effective reduction of the load on one or more relevant cells by preventing that relevant MSISDN-numbers are automatically authenticated in normal network traffic. This is done by blocking out- and in-going calls.

Figure 7:
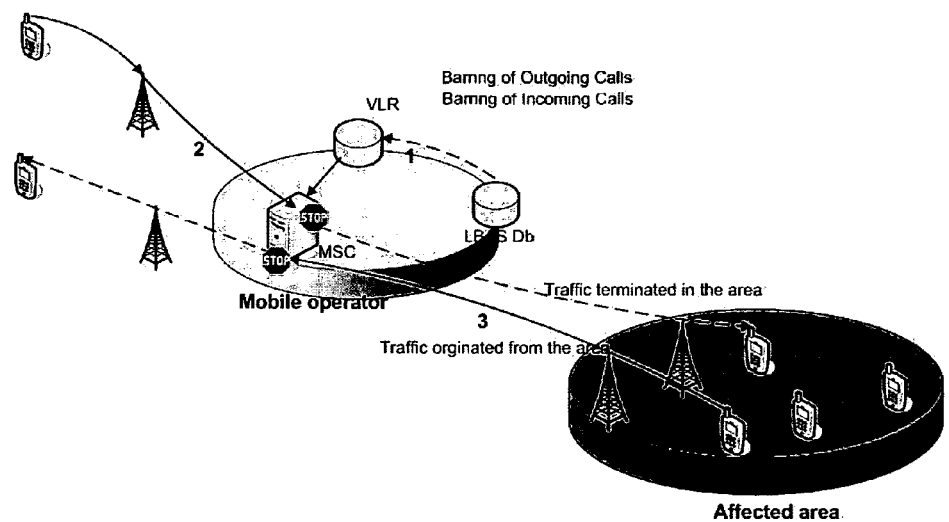
FIG. 7 shows schematically how MSC blocks out- and in-going calls when a prevention tag is set.

FIG. 7 shows schematically how MSC blocks out- and in-going calls when a prevention tag is set.

One or more embodiments of the invention is a further improvement of the LBAS system, and is a method for avoiding overload of blocking of a mobile network when localizing and sending of alert messages to a plurality of mobile phone users located in a specific geographical area. This is performed independently of any user preferences on the mobile phones, and the method is performed in said optimizing message distribution component (A-SMSC) connected to the mobile network. The method comprises the following steps:

a) receiving an alert initiation message comprising information about the content of the message and where it is to be sent, represented as relevant cells;

b) receiving updated information of mobile station ISDNs (MSISDN) number with current serving cells on base station system (BSS) level;

c) assessing received information and determine the relevant mobile phones with corresponding MSISDN numbers to send alert messages to;

d) placing a prevention tag for the determined relevant mobile phones on MSC/VLR level, where the tag indicates that the mobile phones with corresponding MSISDN numbers that alert messages are going to be sent to are not authenticated when these are trying to initiate a call from the specific geographical area to MSC, and further that external calls to the determined relevant mobile phones are not to be connected;

e) sending alert messages from the A-SMSC through a serving MSC to relevant mobile phones with corresponding MSISDN numbers located in the specific geographical area, an f) removing placed tags for said relevant mobile phones after finishing the alerting.

One or more embodiments of the invention is also characterized by a system for performing the method described above.

Steps d) and f) contribute to one or more embodiments of the present invention. One or more embodiments of the present invention prevents the mobile network being used when sending alert messages is overloaded and blocked. This is enabled by placing a prevention tag for the determined relevant mobile phones determined by their corresponding MSISDN numbers. This is performed on MSC/VLR level. The result of this is that MSC prevents that these numbers are identified when mobile phones connected to these tries to initiate a call from the specific geographical area to the MSC. Further, incoming calls to the set relevant MSISDN of the mobile phones will not be connected as long as the prevention tag is placed.

This will ensure that the use of channels of the mobile network while sending alert messages will be reduced, and will thus contribute such that the mobile network is more reliable when sending alert messages in emergency situations in specific areas.

By blocking all normal traffic to and from relevant mobile phones in one ore more specific geographic area may not be desirable. It will be desirable that some emergency resources and other prioritized resources can use the mobile network when sending alert messages.

Figure 8:
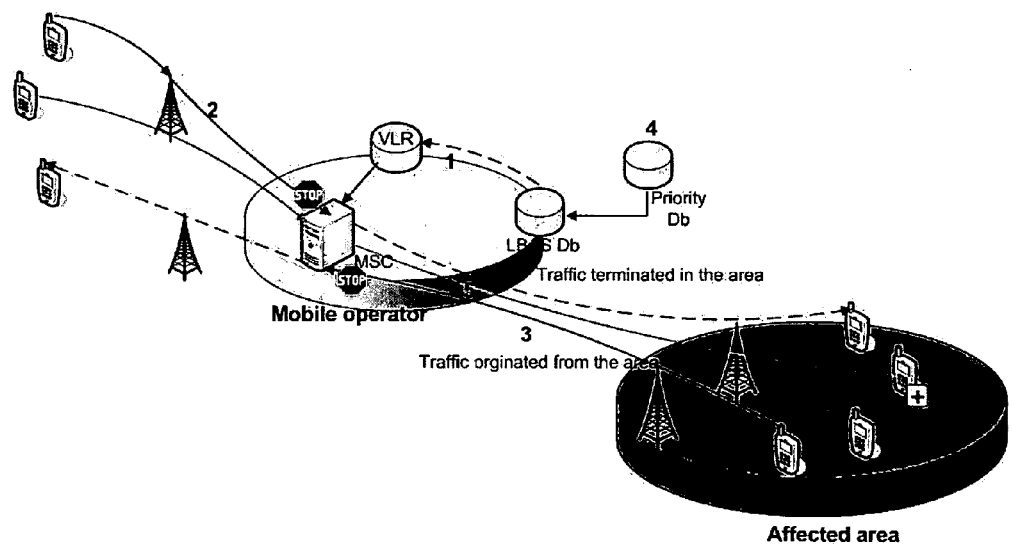
FIG. 8 shows the architecture used for preventing that specific MSISDN numbers are blocked.

FIG. 8 shows the architecture used for preventing that specific MSISDN numbers are blocked. By including a priority database (Priority Db) in the system which comprises lists of numbers that are not to be blocked by the prevention tag, selected numbers that are not to be blocked will be able to use the communication network as usual during the sending of alert messages.

The priority database is connected to the LBAS database, and each number which is blocked via prevention tags set for relevant numbers in VLR is compared with MSISDN numbers stored in the priority database, such that these are not prevented from normal communication out and in from the specific geographical area while alert messages are being sent.

One or more embodiments of the present invention also deals with a system for performing the method described above. Such a system may comprise different components with the main goal to be able to perform the method according to one or more embodiments of the present invention.

The components of LBAS and the further developed version described here can easily be installed in the environment of the mobile operator without interfering with existing core infrastructure. The use of LBAS functionality must however be highly secured both with regard to misuse and personal data protection. Only certain certified systems/applications, e.g. PAS, will be certified to be integrated to LBAS. Users can for instance be emergency authorities in any country. Europe as well as other developed areas like the US has so far been the main target for mobile high tech. However, due to rapid spreading of the mobile technology, combined with natural and climatic threats in for instance south Asian countries, and the fact that a many of these countries are popular tourist destinations, makes LBAS is an ideal system for alerting and protecting both inhabitants and tourists in the region.

For a person of skill in the art it is obvious that there are many different ways of implementing such a system. A specific implementation that can be seen from the description above is intended to be as an example of how one or more embodiments of the invention can be implemented.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for preventing overload and blocking of a mobile network when sending of alert messages to a plurality of mobile phone users located in a specific geographical area, independently of any user preferences on mobile phones,
   wherein the method is performed in an optimizing message distribution component (A-SMSC) connected to the mobile network, and
   wherein the method comprises:
   an alert initiating message receiving step of receiving an alert initiation message comprising information about content of the message and where the message is to be sent, represented as relevant cells, performed as a request from a location based alert system server to A-SMSC, and information about the relevant cells is determined by a location based alert system geo-targeting module "LBAS GT" by converting information of a specific geographical area to corresponding cell ids;
   an updated information receiving step of receiving updated information of mobile station ISDNs (MSISDN) number with current serving cells on base station system (BSS) level, wherein information is acquired by looking up entries in a location based alert system database "LBAS Db" with updated information of MSISDN numbers of the mobile phones connected to the relevant cells, represented by the cell ids within the specific requested geographical area;
   an assessing step of assessing received information and determining relevant mobile phones with corresponding MSISDN numbers to send alert messages to;
   a placing step of placing a prevention tag for the determined relevant mobile phones on MSC/VLR level, wherein the prevention tag indicates that alert messages that are sent to the mobile phones with the corresponding MSISDN numbers are not to be authenticated when the mobile phones are trying to initiate a call from the specific geographical area to MSC, and further indicates that external calls to the determined relevant mobile phones are not to be connected;
   a sending step of sending alert messages from the A-SMSC through a serving MSC to the relevant mobile phones with the corresponding MSISDN numbers located in the specific geographical area, and
   a removing step of removing placed tags for said relevant mobile phones after finishing the alerting.

2. The method according to claim 1, wherein the placing step further comprises comparing the tagged relevant mobile phones with MSISDN numbers that are stored in a priority database, and removing the tag from mobile phones that have MSISDN stored in the priority database, such that the mobile phones are not prevented from normal communication, in and out from the specific geographical area, while alert messages are being sent.

3. The method according to claim 1, wherein the A-SMSC is connected to:
   a cell coverage component (LBAS GT) with information about geographical area where the alert messages are to be sent,
   the location based alert system database (LBAS Db) with updated information of MSISDN number with current serving cell, and a serving MSC for controlling cells represented by groups of base transceiver stations (BTS) located at fixed geographical locations providing mobility management for mobile stations, wherein the assessing of received information in the assessing step includes performing a paging procedure on relevant MSISDNs for receiving ids of present serving cells for each relevant MSISDN, and checking whether the returned cell ids are within the range of the cells covering the relevant geographical area.

4. The method according to claim 3, wherein LBAS GT is connected to an LBAS Service that is connected to an interface for managing and controlling the method, wherein the interface is used for selecting type of alert message and the geographical area to where the messages are to be sent.

5. The method according to claim 3, wherein the LBAS GT converts information of a specific geographical area to cell ids, by reading a database list with information on which area each cell is covering, and screening only cells that are located in the relevant geographical area before the information is sent to the A-SMSC.

6. The method according to claim 3, wherein LBAS Db is dynamically updated with information received from a probe monitoring the traffic between a mobile switch centre (MSC) and a visitor location register (VLR) residing within the network holding current details about subscribers and equipment used.

7. The method according to claim 3, wherein the cell id results are stored in a temporary table used for randomizing the cell ids before the paging procedure in order to reduce queued traffic load on the same cell.

8. The method according to claim 1, wherein the A SMSC measures the time elapsed from sending an alert message to an MSISDN number through connected cell to receiving a confirmation from the cell, and if the time elapsed is above a certain limit, the MDC will reduce a load of the current cell by sending the next alert message through another cell.

9. A system for preventing overload and blocking of a mobile network when sending of alert messages to a plurality of mobile phone users located in a specific geographical area, and doing so independently of any user preferences on the mobile phones,
wherein the system comprises:
an optimizing message distribution component (A-SMSC) connected to the mobile network, and
an alert initiating message receiving component for receiving an alert initiation message comprising information about content of the message and where the message is to be sent, represented as relevant cells, performed via a cell coverage component (LBAS GT) with information about geographical area and corresponding cell ids;
an updated information receiving component for receiving updated information, from a location based alert system database (LBAS Db), of mobile station ISDN (MSISDN) numbers with current serving cells on base station system (BSS) level,
an assessing component for assessing received information and determining the location the relevant mobile phones with corresponding MSISDN numbers to send alert messages to,
a placing component for placing a prevention tag for the determined relevant mobile phones on MSC/VLR level, where the prevention tag indicates that alert messages that are sent to the mobile phones with the corresponding MSISDN numbers are not to be authenticated when the mobile phones are trying to initiate a call from the specific geographical area to MSC, and further indicates that external calls to the determined relevant mobile phones are not to be connected;
a sending component for sending alert messages from the A-SMSC through a serving MSC to the relevant mobile phones with the corresponding MSISDN numbers located in the specific geographical area, and
a removing component for removing placed tags for said relevant mobile phones after finishing the alerting.

10. The system according to claim 9, the placing component further comprises a comparing component for comparing the tagged relevant mobile phones with MSISDN numbers that are stored in a priority database, and removing the tag from mobile phones that have its MSISDN stored in the priority database, such that the mobile phones are not prevented from normal communication, in and out from the specific geographical area, while alert messages are being sent.

11. The system according to claim 9, wherein the LBAS GT is connected to an LBAS Service that is connected to an interface for managing and controlling the system, wherein the interface is used for selecting type of alert message and the geographical area to where the messages are to be sent.

12. The system according to claim 9, wherein the LBAS GT comprises a converting component for converting information of a specific geographical area to cell ids, including a database with information on which area each cell is covering, and a screening component for selecting only cells that are located in the relevant geographical area, and a providing component for providing this information to the A-SMSC.

13. The system according to claim 9, wherein the LBAS Db is connected to a probe for monitoring the traffic between a mobile switch centre (MSC) and a visitor location register (VLR) residing within the network holding current details about subscribers and equipment used.

14. The system according to claim 9, wherein the A SMSC comprises a database for temporary storing of cell id, and a randomizing component for randomizing the cell ids.

15. The system according to claim 9, wherein the A SMSC comprises a measuring component for measuring time elapsed from sending an alert message to a cell to receiving a confirmation from the cell, and a determining component for determining if the time elapsed is above a certain limit, and a reducing component for reducing a load of the current cell by sending the alert message to another cell.

* * * * *